(12) United States Patent
Beitia

(10) Patent No.: US 7,242,133 B2
(45) Date of Patent: Jul. 10, 2007

(54) METHOD FOR PRODUCTION OF A MECHANICAL RESONATOR WITH A PLANAR MONOLITHIC VIBRATING STRUCTURE MACHINED IN A CRYSTALLINE MATERIAL AND RESONATOR PRODUCED THUS

(75) Inventor: José Beitia, Saint Prix (FR)

(73) Assignee: Sagem SA, Paris (FR)

( * ) Notice: Subject to any disclaimer, the term of this patent is extended or adjusted under 35 U.S.C. 154(b) by 138 days.

(21) Appl. No.: 10/511,207

(22) PCT Filed: Apr. 11, 2003

(86) PCT No.: PCT/FR03/01149

§ 371 (c)(1),
(2), (4) Date: May 20, 2005

(87) PCT Pub. No.: WO03/087721

PCT Pub. Date: Oct. 23, 2003

(65) Prior Publication Data

US 2005/0217396 A1    Oct. 6, 2005

(30) Foreign Application Priority Data

Apr. 17, 2002   (FR) ................................. 02 04795

(51) Int. Cl.
*H01L 41/22* (2006.01)
*H01L 41/18* (2006.01)

(52) U.S. Cl. ...................................... 310/360; 310/311

(58) Field of Classification Search ......... 310/311–370
See application file for complete search history.

(56) References Cited

U.S. PATENT DOCUMENTS

| 6,038,524 A | 3/2000 | Leger et al. | |
|---|---|---|---|
| 2002/0158224 A1* | 10/2002 | Aoto et al. | 252/62.63 |
| 2003/0015130 A1* | 1/2003 | Lee et al. | 117/2 |
| 2004/0036971 A1* | 2/2004 | McGuire, Jr. | 359/499 |
| 2004/0189425 A1* | 9/2004 | Iwashita et al. | 333/193 |
| 2004/0231581 A1* | 11/2004 | Aoto et al. | 117/2 |
| 2006/0213429 A1* | 9/2006 | Motoki et al. | 117/86 |

FOREIGN PATENT DOCUMENTS

JP             4-249114    *   9/1992

* cited by examiner

*Primary Examiner*—Thomas M. Dougherty
(74) *Attorney, Agent, or Firm*—Stites & Harbison PLLC; Douglas E. Jackson

(57) ABSTRACT

The invention relates to the production of a mechanical resonator with a planar monolithic vibrating structure machine in a crystalline material. Where the material is trigonal (1), trigonal (2) or hexagonal in structure, said material is cut in the [001] plane or, where said material is cubic in structure, said material is cut in the [111] plane and the vibration mode of order 2 is used. Where the material is tetragonal (1) or tetragonal (2) or hexagonal said material is cut in the [001] plane or where said material is cubic in structure said material is cut in the [001], [100], or [010] plane and the vibration mode of order 3 is used. The resonator thus has a natural material frequency isotropy ($\Delta f_m = 0$).

4 Claims, No Drawings

METHOD FOR PRODUCTION OF A MECHANICAL RESONATOR WITH A PLANAR MONOLITHIC VIBRATING STRUCTURE MACHINED IN A CRYSTALLINE MATERIAL AND RESONATOR PRODUCED THUS

FIELD OF THE INVENTION

The present invention relates to improvements made in the field of gyroscopic devices based on mechanical resonators with a planar monolithic vibrating structure machined in a crystalline material.

DESCRIPTION OF THE PRIOR ART

Gyroscopic devices are devices for measuring a speed of rotation or an angle of rotation about one or more particular axes.

At the present time, there are many techniques used for producing gyroscopic devices, but currently there is a need to have very compact devices (with a size of less than a few cubic centimeters) that can be achieved in high volume for low cost, that can withstand sudden accelerations of high level, and are capable of delivering accurate measurements within a wide range of rotation speeds. Among potential fields of application for such devices, mention may especially be made of the navigation and guiding of small spin-controlled missiles (for example short-range antitank missiles) or spin-controlled munitions (shells or mortars), that is to say projectiles rotating about the roll axis at a high permanent speed of rotation, typically a few revolutions per second in the case of spin-controlled missiles or fin-controlled projectiles, and a few hundred revolutions per second in the case of gyro-controlled projectiles.

To meet this requirement, the technology of vibrating gyroscopes, combined with fabrication of micromachined structures, is particularly suitable. However, although several formulations have emerged and reached a relatively advanced stage of development and industrialization, none of them allows the problem posed by the abovementioned applications to be correctly solved, for which a rotation measurement about the roll axis is necessary. This inability of such formulations to correctly meet the needs stems from the combination of two causes:

the first cause is that they are intrinsically suited to gyrometer-type feedback control (measurement of angular velocity);

the second cause is that the dynamics of the speed of rotation about the roll axis are too fast for gyrometric feedback control to offer sufficient precision and/or result in saturating the sensor electronics used.

Consequently, it is known that the only possible general solution to the problem posed consists in using the devices intrinsically adapted to gyroscopic feedback control (measurement of the angle of rotation). Furthermore, as specified in document FR 2 756 375, the gyroscopic feedback control of a vibrating mechanical resonator placed along the roll axis of a carrier allows high scale-factor precision to be obtained. In combination with resonators feedback-controlled in gyrometer mode about the transverse axes of the carrier, it is thus possible to produce a high-performance system for which the bias errors of the transverse resonators cancel out over one revolution of the carrier about its roll axis.

In the case of devices based on vibrating gyroscope technology, the condition of optimum gyroscopic feedback control involves searching for structures whose frequency anisotropy between the two useful modes coupled through the effect of Coriolis forces is intrinsically zero. The frequency anisotropy may be decomposed into three main terms:

$$\Delta f = \Delta f_m + \Delta f_g + \Delta f_s$$

where $\Delta f$ is the overall frequency anisotropy, $\Delta f_m$ is the frequency anisotropy introduced by the material of the resonator, $\Delta f_g$ is the frequency anisotropy introduced by the geometry of the resonator and $\Delta f_s$ is the frequency anisotropy introduced by the suspension or attachment of the resonator.

Other terms could be added, such as for example the anisotropies introduced by the electronics used, but these terms are assumed to be of second order compared with the terms mentioned here.

Thus, in order for the overall frequency anisotropy $\Delta f$ to be zero, it is sufficient for the three components $\Delta f_m$, $\Delta f_g$ and $\Delta f_s$ all to be zero. Other sufficient conditions are possible, but they necessarily imply compensations between the $\Delta f_m$ and/or $\Delta f_g$ and/or $\Delta f_s$ components, which ends up increasing the complexity of the definition of the structure of the resonator and makes this structure particularly sensitive to the variations of any parameter. It therefore seems fundamental to seek structures for which each term $\Delta f_m$, $\Delta f_g$ and $\Delta f_s$ is zero. However, it is found that the design approach usually adopted consists, in the case of micromachined resonator structures, in taking into account only the geometrical aspects, whereas it is just as fundamental to consider the constituent material of the resonator through its intrinsic symmetries or its symmetries resulting from the cut plane in which the wafer supporting the resonator structure will be cut.

By way of an example illustrating what has just been explained, the known example of a vibrating ring whose geometry is perfectly suited to obtaining gyroscopic feedback control may be considered. By producing this structure in a silicon wafer (by wet etching) cut in the [001] plane and by using the two plane modes of elliptical deformation as principal mode and as secondary mode, $\Delta f_g = 0$ is of course obtained, but $\Delta f_m$ is very much greater than 1 Hz. In practice, for a ring with a mean frequency of 400 Hz, having a diameter of 5 mm and a thickness of 100 μm, $\Delta f_m = 250$ Hz is obtained, so that in the end, by neglecting the frequency anisotropy introduced by the attachment or other elements, an overall frequency anisotropy $\Delta f$ of about 250 Hz is obtained. This result is incompatible with effective gyroscopic feedback control and clearly illustrates the problem raised in the case of resonators obtained using microelectronics technologies.

This is because micromachined resonator structures use, as support materials, crystalline materials that are naturally anisotropic and consequently lend themselves particularly well to micromachining by chemical etching, as is carried out for collective processes in microelectronics. However, offset against the advantage associated with the collective aspect of the machining operations there is the major drawback of the anisotropy of the material. This anisotropy, when no selection rule for the symmetries of the material consistent with the symmetry of the modes used is respected, irremediably results in a nonzero term $\Delta f_m$.

DETAILED DESCRIPTION OF THE INVENTION

The object of the invention is therefore to propose a technological solution (method and device) which achieves, with certainty, frequency isotropy introduced by the crystalline material from which the vibrating resonator with a planar structure is cut, it being understood that the present invention is aimed solely at providing the means for obtaining frequency isotropy introduced by the material ($\Delta f_m = 0$) and that the problems of obtaining frequency isotropies due to the geometry ($\Delta f_g$) and to the suspension ($\Delta f_s$) are to be solved elsewhere for the purpose of obtaining overall frequency isotropy ($\Delta f = 0$) capable of constituting an intrinsically gyroscopic device (see for example document FR 01/02498).

It should be understood that, if the material of the resonator is isotropic, then the intrinsic pulses of the two kth-order modes become equal, this being so whatever k, namely $\omega_1 = \omega_2 = \omega$.

Moreover, the shapes of the two kth-order eigenmodes are identical by rotation of the reference frame through an angle of $\pi/2 k$. Thus, the 2nd-order modes of the vibrating ring correspond to elliptical shapes offset one with respect to the other by an angle of $\pi/4 = 45°$. Likewise, the 3rd-order modes of the vibrating ring correspond to trilobate shapes offset one with respect to another by an angle of $\pi/6 = 30°$.

The cut plane of the crystalline material is defined by the position of its normal vector $\vec{V}$, which is itself defined by its coordinates [x, y, z] in an orthonormal coordinate system Oex, ey, ez. Thus, the sole datum of the three information items [x, y, z] allows the normal vector $\vec{V}$, and therefore the cut plane, to be uniquely defined. For example, the [001] datum gives the coordinates of the normal vector and the plane is parallel to the (ex, ey) plane.

Moreover, it is known that currently known crystalline materials can be divided up into 32 classes distributed in nine families from the standpoint of the representation of rigidity and flexibility matrices: mention may especially be made of the tetragonal (1), tetragonal (2), trigonal (1), trigonal (2), hexagonal and cubic families.

Finally, it should be pointed out that only the vibration modes of order k=2 and k=3 of the vibrating resonators may at the present time be exploited in a practical fashion, whereas the exploitation of vibration modes of higher order (k=4, 5, etc.) would require very complex electronics to be used (increasing the number of excitation/detection electrodes would be incompatible with production of a gyroscopic device of small, or even very small, size).

Admittedly, document WO 01/55675 mentions, just for a silicon crystal, the possibility of a 2nd-order vibration mode with a silicon crystal cut in the [111] plane and a 3rd-order mode with a silicon crystal cut in the [100] plane. However, this is one specific item of information that does not provide a person skilled in the art with any indication, in the case of 2nd- and 3rd order vibrations, as regards the other possible cut planes for silicon, or as regards possible cut planes for other crystalline materials with a cubic structure, or more generally as regards possible cut planes for other crystalline materials.

Having mentioned this, the invention, in a first of its aspects, proposes a method for producing a mechanical resonator with a planar monolithic vibrating structure machined in a crystalline material, characterized in that:

when the crystalline material is chosen from crystalline materials of trigonal (1) or trigonal (2) or hexagonal structure, this material is cut in the [001] plane or, when it is chosen from materials of cubic structure (silicon excluded), it is cut in the [111] plane, and the 2nd-order vibration mode is then used, or else when the crystalline material is chosen from crystalline materials of tetragonal (1) or tetragonal (2) or hexagonal structure, this material is cut in the [001] plane, or, when it is chosen from materials of cubic structure, it is cut in the [001] or [100] plane (silicon excluded) or [010] plane, and the 3rd-order vibration mode is then used, whereby the resonator exhibits natural material-based frequency isotropy ($\Delta f_m = 0$).

These features may be summarized as follows:

for k = 2
| family: | trigonal (1) | → | plane: | [001] |
|---|---|---|---|---|
| | trigonal (2) | → | | [001] |
| | hexagonal | → | | [001] |
| | hexagonal | → | | [001] |
| | cubic (Si excluded) | → | | [111] | for k = 3
| family: | trigonal (1) | → | plane: | [001] |
|---|---|---|---|---|
| | trigonal (2) | → | | [001] |
| | hexagonal | → | | [001] |
| | | | | [001] |
| | cubic | → | | [100] (Si excluded) |
| | | | | [010] |

Of course, the use of the provisions presented may accompany a construction of axisymmetric structure, resulting in geometry-based isotropy $\Delta f_g = 0$.

According to a second of its aspects, the invention proposes a mechanical resonator with a planar monolithic vibrating structure machined in a crystalline material, characterized in that, for the resonator to exhibit material-based frequency isotropy ($\Delta f_m = 0$), the crystalline material is chosen from the following:

a) a crystalline material of tetragonal (1) or tetragonal (2) structure cut in the [001] plane, the resonator then exhibiting material-based frequency isotropy in the 3rd-order vibration mode;

b) a crystalline material of trigonal (1) or trigonal (2) structure cut in the [001] plane, the resonator then exhibiting material-based frequency isotropy in the 2nd-order vibration mode;

c) a crystalline material of hexagonal structure cut in the [001] plane, the resonator then exhibiting material-based frequency isotropy in both the 2nd- and 3rd-order vibration modes; and d) a crystalline material of cubic structure
   cut in the [111] plane (silicon excluded), the resonator then exhibiting material-based frequency isotropy in the 2nd-order vibration mode or
   cut in the [001], [100] (silicon excluded) or [010] planes, the resonator then exhibiting material-based frequency isotropy in the 3rd-order vibration mode.

As a consequence of this, a resonator produced in accordance with the invention by a suitable choice of the constituent crystalline material, of the cut plane of said crystalline material and of the kth-order vibration mode exhibits material-based frequency isotropy ($\Delta f_m = 0$) and, provided that overall frequency isotropy $\Delta f = 0$ is obtained (for example with $\Delta f_g = 0$ and $\Delta f_s = 0$, or with $\Delta f_g + \Delta f_s = 0$) such a resonator may constitute the core for a gyroscopic device of optimum design.

What is claimed is:

1. A method for producing a mechanical resonator with a planar monolithic vibrating structure machined in a crystalline material, comprising the steps of:

when the crystalline material is chosen from crystalline materials of trigonal (1) or trigonal (2) structure, this material is cut in the [001] plane, and the 2nd-order vibration mode is then used, when the crystalline material is chosen from crystalline materials of tetragonal (1) or tetragonal (2) structure, this material is cut in the [001] plane, and the 3rd-order vibration mode is then used, when the crystalline material is chosen from crystalline materials of hexagonal structure, this material is cut in the [001] plane, and the 2nd-order or 3rd-order vibration mode is then used, when the crystalline material is chosen from crystalline materials of cubic structure other than silicon, it is either a) cut in the [111] plane, and the 2nd-order vibration mode is then used, or b) cut in the [100] plane, and the 3rd-order vibration mode is then used, and when the crystalline material is chosen from crystalline materials of cubic structure, it is cut in the [001] or [010] plane, and the 3rd-order vibration mode is then used, whereby the resonator exhibits natural material-based frequency isotropy $\Delta f_m=0$.

2. A mechanical resonator with a planar monolithic vibrating structure machined in a crystalline material, wherein the resonator exhibits a material-based frequency isotropy $\Delta f_m=0$, and wherein the crystalline material is chosen from the following:

a) a crystalline material of tetragonal (1) or tetragonal (2) structure cut in the [001] plane, the resonator then exhibiting material-based frequency isotropy in the 3rd-order vibration mode;

b) a crystalline material of trigonal (1) or trigonal (2) structure cut in the [001] plane, the resonator then exhibiting material-based frequency isotropy in the 2nd-order vibration mode;

c) a crystalline material of hexagonal structure cut in the [001] plane, the resonator then exhibiting material-based frequency isotropy in both the 2nd- and 3rd-order vibration modes;

d) a crystalline material of cubic structure other than silicon, i) cut in the [111] plane, the resonator then exhibiting material-based frequency isotropy in the 2nd-order vibration model, or ii) cut in the [001], or [010] planes, the resonator then exhibiting material-based frequency isotropy in the 3rd-order vibration mode, and e) a crystalline material of cubic structure cut in the [1001] plane, the resonator then exhibiting material-based frequency isotropy in the 3rd-order vibration mode.

3. A method for producing a mechanical resonator with a planar monolithic vibrating structure machined in a crystalline material, comprising the steps of:

when the crystalline material is chosen from crystalline materials of trigonal (1) or trigonal (2) structure, this material is cut in the [001] plane, and the 2nd-order vibration mode is then used, when the crystalline material is chosen from crystalline materials of tetragonal (1) or tetragonal (2) structure, this material is cut in the [001] plane, and the 3rd-order vibration mode is then used, when the crystalline material is chosen from crystalline materials of hexagonal structure, this material is cut in the [001] plane, and the 2nd-order or 3rd-order vibration mode is then used, and when the crystalline material is chosen from crystalline materials of cubic structure, it is cut in the [001] or [010] plane, and the 3rd-order vibration mode is then used, whereby the resonator exhibits natural material-based frequency isotropy $\Delta f_m=0$.

4. A mechanical resonator with a planar monolithic vibrating structure machined in a crystalline material, wherein the resonator exhibits a material-based frequency isotropy $\Delta f_m=0$, and wherein the crystalline material is chosen from the following:

a) a crystalline material of tetragonal (1) or tetragonal (2) structure cut in the [001] plane, the resonator then exhibiting material-based frequency isotropy in the 3rd-order vibration mode;

b) a crystalline material of trigonal (1) or trigonal (2) structure cut in the [001] plane, the resonator then exhibiting material-based frequency isotropy in the 2nd-order vibration mode;

c) a crystalline material of hexagonal structure cut in the [001] plane, the resonator then exhibiting material-based frequency isotropy in both the 2nd- and 3rd-order vibration modes; and d) a crystalline material of cubic structure cut in the [100] plane, the resonator then exhibiting material-based frequency isotropy in the 3rd-order vibration mode.

* * * * *

UNITED STATES PATENT AND TRADEMARK OFFICE
CERTIFICATE OF CORRECTION

PATENT NO. : 7,242,133 B2  Page 1 of 1
APPLICATION NO. : 10/511207
DATED : July 10, 2007
INVENTOR(S) : Beitia It is certified that error appears in the above-identified patent and that said Letters Patent is hereby corrected as shown below:

Column 5, line 51: change "[001], or [010] planes" to --[100] plane--.

Column 6, line 2: change "[1001] plane" to --[001] or [010] planes--.

Column 6, line 49: change "[100] plane" to --[001] or [010] planes--.

Signed and Sealed this

Twenty-fifth Day of March, 2008

JON W. DUDAS
*Director of the United States Patent and Trademark Office*